(12) United States Patent
Titmas (10) Patent No.: US 7,211,194 B2
(45) Date of Patent: May 1, 2007

(54) GRAVITY PRESSURE VESSEL AND RELATED APPARATUS AND METHODS

(75) Inventor: James A. Titmas, Cuyahoga Falls, OH (US)

(73) Assignee: Eau-Viron, Inc., Hudson, OH (US)

( * ) Notice: Subject to any disclaimer, the term of this patent is extended or adjusted under 35 U.S.C. 154(b) by 212 days.

(21) Appl. No.: 10/974,209

(22) Filed: Oct. 27, 2004

(65) Prior Publication Data

US 2006/0086673 A1 Apr. 27, 2006

(51) Int. Cl.
*C02F 1/72* (2006.01)

(52) U.S. Cl. ............... 210/752; 15/104.05; 15/104.09; 134/8; 134/22.11; 165/95; 210/761; 210/177; 210/199; 210/205; 422/184.1; 422/189; 422/194; 422/207; 422/210

(58) Field of Classification Search ............... 210/761
See application file for complete search history.

(56) References Cited

U.S. PATENT DOCUMENTS

| | | | |
|---|---|---|---|
| 3,449,247 A | 6/1969 | Bauer | 210/63 |
| 3,606,999 A | 9/1971 | Lawless | 23/1 |
| 3,853,759 A | 12/1974 | Titmas | 210/63 |
| 4,272,383 A | 6/1981 | McGrew | 210/741 |
| 4,338,199 A | 7/1982 | Modell | 210/721 |
| 4,564,458 A | 1/1986 | Burleson | 210/747 |
| 4,594,164 A | 6/1986 | Titmas | 210/741 |
| 4,792,408 A | 12/1988 | Titmas | 210/747 |
| 4,803,054 A | 2/1989 | Sillerud et al. | 422/109 |
| 4,874,560 A | 10/1989 | Titmas | 261/76 |
| 5,030,291 A | 7/1991 | Titmas | 134/8 |
| 5,080,720 A | 1/1992 | Titmas | 134/22.11 |
| 5,160,581 A | 11/1992 | Titmas | 162/61 |
| 5,190,665 A | 3/1993 | Titmas et al. | 210/743 |
| 5,711,817 A | 1/1998 | Titmas | 127/37 |
| 5,879,637 A | 3/1999 | Titmas | 422/129 |
| 6,096,283 A * | 8/2000 | Cooper et al. | 423/437.1 |
| 6,716,360 B2 * | 4/2004 | Titmas | 210/750 |
| 6,773,581 B2 * | 8/2004 | Hazlebeck et al. | 210/178 |

OTHER PUBLICATIONS

"An Overview of the Vertical Reaction Vessel System for the Aqueous Phase Oxidation of Municipal Sludge at Longmont, Colorado"—Hazmat International Conference, Atlantic City (Jun. 1993).

* cited by examiner

*Primary Examiner*—Peter A. Hruskoci
(74) *Attorney, Agent, or Firm*—Renner, Kenner, Greive, Bobak, Taylor & Weber (57) ABSTRACT

A gravity pressure vessel (GPV) for processing a fluid stream containing organic materials provides several improvements to the art. In one embodiment, a GPV of the present invention sustains the heat energy requirements of a hydrolysis GPV by including therein, a first reaction chamber for conducting an exothermic reaction, and subsequently providing a second reaction chamber for hydrolysis of certain organic materials refractory to the exothermic reaction. Another embodiment provides for the perpetual cleaning of the heat transfer surfaces of the GPV. Still another embodiment provides for selective alteration of a hydrolysis reaction within a GPV independent of the flow of the fluid stream through the GPV.

13 Claims, 4 Drawing Sheets

GRAVITY PRESSURE VESSEL AND RELATED APPARATUS AND METHODS

TECHNICAL FIELD

This invention relates to a gravity pressure vessel (GPV) and, more particularly, to a GPV having improvements therein that, inter alia, sustain (but do not overfeed) the heat energy requirements of the GPV, allow for the combustion of materials followed subsequently by hydrolysis of materials refractory to the combustion process, perpetually clean the heat transfer surfaces of the GPV, and allow the endothermic reaction conditions within the GPV to be altered without affecting the flow of the processed stream. Because of these improvements to the GPV, alternative methods and apparatus may be employed in the conversion of waste materials to desirable materials (e.g., ethanol).

BACKGROUND ART

For many years, attempts have been made to remove or separate particular materials within waste materials in water through various reaction processes so that they may be converted or recycled to useful products. In doing so, many disclosures have utilized deep well reactors, known as gravity pressure vessels (GPVs), to aid in the removal or separation of dissolved and non-dissolved organic materials and the like. By using a GPV, the operator can increase the speed and efficiency of the reaction processes employed therein.

For example, it is well known that the speed and efficiency of wet combustion (also known as "wet oxidation") of certain organic materials can be increased by conducting this reaction process in water at elevated temperatures and pressures such as may be provided by a GPV. In wet oxidation, oxygen reacts with organic materials that have been dissolved in water. U.S. Pat. Nos. 3,853,759 and 4,792,408, incorporated herein by reference, both disclose the use of oxygen, either present in the waste materials in water themselves, or supplied to the process stream via an external source, to promote the exothermic reaction of various waste materials at or near a reaction chamber in the bottom of a GPV. The heat energy created by the oxidation reaction in the bottom chamber of the GPV is then used to convey heat energy outward from the process stream as it flows upward through the center of the GPV to the incoming process stream surrounding the upward flow for further reaction, thereby providing an essentially self-sustaining pre-heating of the incoming process stream into the reaction chamber, with any excess being realized at the surface outlet. It will be appreciated that any heat energy lost in such a process will be attributable to the terminal temperature difference in the water after processing and any heat energy loss to the strata.

Likewise, it is well known that the speed and efficiency of weak acid hydrolysis of certain other, different organic materials can be increased by conducting this process in water at elevated temperatures and pressures, again as may be provided by a GPV. To induce weak acid hydrolysis within a GPV, an acid is injected into an endothermic reaction chamber of the GPV, typically positioned within the updraft flow of the process stream. Current GPV technology uses a flow accelerated reaction chamber, which induces and quenches hydrolysis of the materials quickly and effectively. For example, U.S. Pat. Nos. 5,711,817 and 5,879,637, incorporated herein by reference, disclose the conversion of cellulosic material to ethanol by acid hydrolysis of the cellulosic material at elevated temperatures and pressures with a GPV, and fermenting the product thereof. However, in order to sustain the endothermic reaction, i.e., hydrolysis, as set forth in these earlier patents, enough added heat energy, typically in the form of steam and hot water supplied from an external source, must have been supplied to the process stream prior to the reaction in order for the reaction to be effective. The addition of this heat energy to a GPV required to sustain the endothermic reaction detracts from the usefulness of the process, and makes it much less cost effective. Moreover, there are environmental aspects involved with the generation of external heat energy that may also be disadvantageous.

Furthermore, in addition to the need for added external heat energy to conduct the hydrolysis reaction, it is known that weak acid hydrolysis of certain waste materials within a GPV results in the creation of useless by-products that must be discarded, destroyed, mitigated, or left to contaminate the atmosphere or water upon completion of the reaction. Attempting to rid the processed stream of these by-products after processing further limits the usefulness, efficacy, and economic viability of the process.

For example, in U.S. Pat. Nos. 5,711,817 and 5,879,637, the raw waste materials being processed will contain, for example, a percentage of lignin that is refractory at the temperature and pressure employed in the hydrolysis process, and therefore, will not hydrolyze. Accordingly, the contaminant, e.g., lignin, produces a strong by-product waste stream that must be dealt with upon completion of the processing steps through the GPV in an efficient manner, again, creating increased costs and reducing efficiency.

In the past, emphasis was placed, first, on attempting to use wastewater treatment processes and apparatus to control the accumulation of dissolved organic debris in the recycled water used for these processes, and second, on attempting to mitigate the undesired emission of fossil fuel air emissions from steam generators required to sustain the endothermic reactions necessary for these processes. To date, it is believed no attempts have been made to extract or mitigate the accumulation of dissolved toxic metals introduced from the feed materials to be processed. Such practices were believed to be counterproductive to the usefulness of the processes.

Nevertheless, GPVs provide a suitable environment with respect to temperature and pressure for conducting and enhancing either of these reactions, i.e., wet oxidation or hydrolysis. By oxidizing via wet oxidation, or separately, hydrolyzing via very mild acid hydrolysis, particular organic materials, the materials can be more easily separated from other components, such as toxic metals, and the like, and as a result, with further processing, desired materials, such as ethanol, lactic acid, and the like, can ultimately be produced from the initial raw waste materials.

Another shortcoming in the existing art with respect to GPVs is the difficulty in beginning the continuous process from a cold start. In U.S. Pat. No. 4,792,408, this shortcoming is obviated by the use of an isolated burner that produces water from combustion products that must be extracted. In U.S. Pat. Nos. 3,853,759, 5,711,817 and 5,879,637, this shortcoming is obviated by the use of steam and hot water injected at the peak pressure location in the vessel. The delivery of enough steam to sustain the entire thermal heat energy needs of these processes is inefficient to the point of detraction from the otherwise useful character of those inventions.

The most commonly used commercial technique by which the heat transfer surfaces for internal heat energy recovery are maintained clean in a GPV is set forth in U.S. Pat. Nos. 3,853,759 and 4,272,383. These patents disclose the use of a nitric acid solution to dissolve undesired mineral deposits that commonly form on the heat transfer surfaces of the GPV. It is these mineral deposits that detract from internal heat energy recovery. In other words, mineral deposits formed on the surfaces of the GPV separating the outer, incoming downward-flow raw waste materials feed stream from the inner, upward-flow processed stream prevent heat energy from being more fully conveyed from the hotter processed stream to the cooler raw waste materials feed stream while in operation. Using the nitric acid solution procedure, however, causes the GPV to be closed or shut down to normal operations for as much as 20% of the available operating time. Moreover, it is well known that the handling and use of nitric acid presents serious safety and environmental issues.

Other patents, such as U.S. Pat. Nos. 5,030,291 and 5,080,720, describe mechanical devices to enhance internal heat energy recovery in a GPV, i.e., to clean the GPV. However, these patents disclose mechanisms that are used only periodically. In contrast, the need for cleaning a GPV, to the degree required to sustain the heat energy requirements of the GPV in relying in greater part on the exothermic oxidation of a small percentage of the total organic materials flowing in water, is continuous.

The manner of cleaning a GPV disclosed in U.S. Pat. Nos. 5,030,291 and 5,080,720 requires a minimum gap between the GPV tubulars of about one inch (2.54 cm) to allow the passage of the device to clean the apparatus. It is also observed that the cleaning device employed by these patents will have difficulty cleaning the recessed mixing zones or restricted gaps of the present art GPVs. Further, U.S. Pat. No. 4,272,383, which teaches nitric acid cleaning, cannot accommodate cleaning in that manner if the minimum space between tubulars has been closed by the lack of centering the tubulars in the apparatus in addition to the difficulty of cleaning recessed mixing zones.

One currently available technique for inducing acid hydrolysis in a GPV is described in U.S. Pat. Nos. 5,711,817 and 5,879,637. While the reaction time of the waste materials in the process stream may be varied by changing the rate of flow of the process stream carrying the materials through the GPV, there is no way to change the distance between the flow point of initiation of the hydrolysis reaction and the flow point of quenching the hydrolysis reaction without physically removing the central core of the GPV and physically cutting and changing the length of the tubular between the points of initiation and quenching. Likewise, these same references refer to processing techniques whereby a dense acid, such as sulfuric acid, can be managed in the form of a hydraulic column partially flooded with waste or water, and partially air gapped. Such a processing technique can cause irregular bursts of flow of acid into the reaction chamber in the bottom of the GPV.

Thus, there remains a need for improvements to GPVs, and related processing methods, whereby the processing of organic wastes by the partial exothermic wet oxidation of a percentage of the waste materials feed stream can be made effective and useful by enhanced internal heat energy recycling within the GPV. Specifically, there remains at least a need for an improved GPV and a related method for the surgical sequential use of partial wet oxidation of dissolved organics, including the processing of dilute waste materials in water suspension, to enhance the very weak acid hydrolysis of the remaining cellulosic fibers in the waste materials that were refractory to the wet oxidation process, while mitigating the potential adverse effects of dissolved metals and non-productive hydrocarbons.

In turn, such a GPV and related method will also create a need to exclude certain materials from the GPV. For example, in many flow streams containing raw waste materials, certain dissolved materials, such as disaccharides and mono-saccharides, may exist therein that would be damaged by the introduction of oxygen that attacks undesired, dissolved toxic metals, lignin, and the like. Consequently, a need to separate these materials before they enter the GPV and, desirably, to reincorporate them into the process stream, after the reaction processes in the GPV, also remains.

SUMMARY OF THE INVENTION

It will, therefore, be appreciated that one aspect of one or more embodiments of the present invention seeks to utilize exothermic chemical energy of undesired, dissolved hydrocarbon contaminants, i.e., dissolved organic materials, such as lignin, present in a raw materials feed stream of a GPV to at least supplement the supply of heat energy required to enhance subsequent endothermic reactions in a GPV in a precise and controlled manner and, more preferably, to precisely sustain the heat energy requirements of the entire GPV, avoiding excess heat energy that might have a deleterious affect on desired organic materials. The exothermic chemical energy of the dissolved hydrocarbon contaminants is released as heat energy via at least partial wet oxidation of the contaminants in a wet combustion reaction chamber within the GPV. As an advantageous result of the at least partial combustion of the dissolved hydrocarbon contaminants, at least some of these hydrocarbon contaminants will be removed from the processed stream without exposing the environment to these contaminants by discharge into water or the atmosphere. In addition to the dissolved hydrocarbon contaminants, trace metal contaminants may also be oxidized, thereby advantageously causing these contaminants to also be extracted from the process in a reasonable and efficient manner.

Another aspect of one or more embodiments of the present invention provides for the controlled partial oxidation of certain undesired organic materials followed sequentially by the controlled hydrolysis of other, different organic materials within the same GPV. While some of the advantages of controlled oxidation are discussed above, employing hydrolysis within the same GPV is advantageous in that the use of the heat energy created by the exothermic oxidation reaction can be used to supply at least some of the energy required by the endothermic hydrolysis reaction. Moreover, at least one embodiment of the present invention advantageously enables the operator to alter the distance between the flow point of initiation of the hydrolysis reaction and the point of quenching the hydrolysis reaction without interrupting the processing of raw materials. In another embodiment of the present invention, the operator may advantageously regulate the introduction of an acid into the endothermic reaction chamber by metering the acid as a gas to overcome the disadvantages of dealing with the weight of a hydraulic column of dense liquid acid.

Still another aspect of one or more embodiments of the present invention provides for the continuous cleaning of the heat exchange surfaces of the GPV in a manner that does not interfere with production and takes maximum practicable advantage of limited available exothermic heat energy. At least one embodiment may advantageously provide means to access recessed mixing zones and facilitate cleaning of recesses in the GPV. Moreover, in cleaning the GPV, there will be no limit to the reduction in size of the gap between the walls of the GPV flow path, thereby not inhibiting the minimum size selection of the GPV.

Still another aspect of one or more embodiments of the present invention provides for the enhancement of the usefulness of a GPV by simplifying the manner for sustaining the flow pathway and internal heat energy transfer and recovery. In at least one embodiment of the present invention, centering the internal heat exchange surfaces in the flow path of the water suspended materials to be processed may enhance the internal heat energy recovery within a GPV. In another embodiment, extending the heat transfer surfaces of the internal heat exchange surfaces may enhance the internal heat energy recovery.

Yet a further aspect of one or more embodiments of the present invention-allows for the separation of valuable dissolved organic materials such as monosaccharides, disaccharides and the like, from the raw waste materials prior to entering the GPV. At least one embodiment advantageously permits these desired dissolved organic materials to bypass the GPV and then to be reincorporated in the processed stream after the GPV.

One or more of these aspects of the present invention, together with other advantages over the existing art relating to GPVs and related apparatus, which will become apparent from the description and drawings that follow, are accomplished by the invention as hereinafter described and claimed.

In general, the present invention provides a gravity pressure vessel for processing a fluid stream containing at least dissolved and non-dissolved organic materials in water, the gravity pressure vessel comprising: an inlet passage for carrying the fluid stream downward; a first reaction chamber receiving the fluid stream from the inlet passage and causing an exothermic reaction between an oxidant and at least a partial amount of at least one dissolved organic material; an outlet passage for carrying the fluid stream upward; a second reaction chamber located within a portion of the outlet passage and receiving the fluid stream from the first reaction chamber, wherein the second reaction chamber induces the hydrolysis of at least one non-dissolved organic material refractory to the exothermic reaction and subsequently quenches the hydrolysis of the hydrolyzed organic material within the fluid stream; and wherein the outlet passage conveys the fluid stream containing hydrolyzed organic material upward and out of the gravity pressure vessel.

The present invention also provides a method for processing a fluid stream containing dissolved and non-dissolved organic materials through a gravity pressure vessel comprising the steps of: introducing the fluid stream downward into the gravity pressure vessel; partially oxidizing the dissolved organic materials from the fluid stream in a first reaction chamber of the gravity pressure vessel to substantially sustain the heat energy requirements of the gravity pressure vessel; subsequently inducing hydrolysis of at least one non-dissolved organic material refractory to oxidation within the fluid stream, and thereafter, quenching the hydrolyzed material within the fluid stream; and carrying the fluid stream containing the hydrolyzed material from the gravity pressure vessel.

The present invention further provides a gravity pressure vessel for processing a fluid stream containing waste materials, the gravity pressure vessel comprising: an outer wall for containing the fluid stream within the gravity pressure vessel; a conduits tubular jacket located concentrically within the outer wall; and a heat exchange tubular located concentrically between the outer wall and the conduits tubular jacket, the heat exchange tubular having a first paddle extending radially outward toward the outer wall and into a first fluid stream passage and a second paddle extending radially inward toward the conduits tubular jacket and into a second fluid stream passage, wherein the heat exchange tubular is rotatable with respect to the outer wall and the conduits tubular jacket such that first and second paddles sweep many deposits from the first and second fluid stream passages.

The present invention still further provides a method for substantially cleaning deposits from fluid stream passages within a gravity pressure vessel, the method comprising providing a gravity pressure vessel including an outer wall for containing the fluid stream within the gravity pressure vessel; a conduits tubular jacket located concentrically within the outer wall; and a heat exchange tubular located concentrically between the outer wall and the conduits tubular jacket, the heat exchange tubular having a first paddle extending radially outward toward the outer wall and into a first fluid stream passage and a second paddle extending radially inward toward the conduits tubular jacket and into a second fluid stream passage, wherein the heat exchange tubular is rotatable with respect to the outer wall and the conduits tubular jacket; rotating the heat exchange tubular such that first and second paddles sweep many deposits from the fluid stream passages.

The present invention yet further provides, in a gravity pressure vessel for processing a fluid stream containing at least non-dissolved organic materials, a hydrolysis reaction chamber for hydrolyzing the non-dissolved organic materials in the fluid stream, the chamber comprising: at least one first injection point for inducing hydrolysis of the non-dissolved organic materials; and a plurality of second injection points for quenching hydrolysis of the non-dissolved organic materials, wherein each second injection point in spaced differently in distance from the at least one first injection point.

The present invention also provides a gravity pressure vessel for processing a fluid stream containing at least dissolved and non-dissolved organic materials in water, the gravity pressure vessel comprising: an outer wall for containing the fluid stream within the gravity pressure vessel; a conduits tubular jacket located concentrically within the outer wall; and a heat exchange tubular located concentrically between the outer wall and the conduits tubular jacket, the heat exchange tubular having a first paddle extending radially outward toward the outer wall and into an inlet passage defined between the outer wall and the heat exchange tubular for carrying the fluid stream downward; and a second paddle extending radially inward toward the conduits tubular jacket and into an outlet passage defined between the heat exchange tubular and the conduits tubular jacket for carrying the fluid stream upward; a first reaction chamber receiving the fluid stream from the inlet passage and causing an exothermic reaction between an oxidant and at least a partial amount of at least one dissolved organic material; a second reaction chamber located within a portion of the outlet passage and receiving the fluid stream from the first reaction chamber, wherein the second reaction chamber includes at least one first injection point for inducing hydrolysis of at least one non-dissolved organic material refractory to the exothermic reaction; and a plurality of second injection points for quenching hydrolysis of the non-dissolved organic materials, wherein each second injection point is spaced differently in distance from the at least one first injection point; wherein the outlet passage conveys the fluid stream containing hydrolyzed organic material upward and out of the gravity pressure vessel, and wherein the heat exchange tubular is rotatable with respect to the outer wall and the conduits tubular jacket such that first and second paddles sweep many deposits from the first and second fluid stream passages.

PREFERRED EMBODIMENTS FOR CARRYING OUT THE INVENTION

The present invention relates generally to various improvements in the art of gravity pressure vessels (GPVs). For example, at least one embodiment of the present invention provides for substantially sustaining the heat energy requirements of a GPV of the type suitable for hydrolyzing at least one non-dissolved organic material, by partial exothermic oxidation of dissolved organic contaminants in a fluid stream. By the phrase "sustaining the heat energy requirements," it is meant that all of the heat energy lost due to the terminal temperature difference between the fluid stream introduced into the GPV and the fluid stream exiting the GPV, as well as any heat energy lost to the earth's strata, is at least partially replenished in the GPV by the partial oxidation of the dissolved organic contaminants in the fluid stream. In a preferred embodiment, all of the heat energy will be fully sustained and will be replenished with substantially no excess heat energy generated. That is, the oxidation process will completely replenish the lost heat energy but will not add any unnecessary heat energy to the processing in the GPV. In an alternative embodiment, only a large percentage of the heat energy lost will be replenished using the oxidation process. That is, for example, partial oxidation of dissolved organic contaminants, such as lignin, may account for at least 50 percent and, more preferably, 80 percent or more of the heat energy required in the GPV. Any additional heat energy may be obtained by injecting steam and hot water at the peak pressure location in the vessel as it known in the art.

In order to accomplish this invention, it will be understood that the GPV of the present invention includes two separate reaction chambers. In the first reaction chamber, a wet oxidation process occurs. This process may include the step of introducing a selective amount of oxidant into a first reaction chamber to exothermically react with one or more dissolved organic contaminants, such as lignin, within the fluid stream received from an inlet passage of the gravity pressure vessel. Importantly, the amount of oxidant, such as oxygen, may be limited such that only partial oxidation of the dissolved organic contaminants may occur. That is, all of the oxidant will be used before the dissolved organic contaminants are oxidized. In prior art GPVs using oxidation reactions, the reaction chamber is typically saturated with an oxidant in order to oxidize as many contaminants as possible. It is also understood that such prior art GPVs do not have separate hydrolysis reactors in the same GPV.

In addition, the pressure induced in the wet oxidation reaction chamber must be greater than that pressure (known in the art as the "pressure of saturation") that is consistent with the peak temperatures of the wet oxidation reaction chamber. Such "overpressure" may be induced by controlling various engineering parameters known in the art, to ensure that significant oxygen will be dissolved in water in the oxidation reaction chamber to effect rapid oxidation of the dissolved organic contaminants. At saturation pressure for any given temperature, i.e., the line of saturation for water (where both steam and water can coexist), no oxygen dissolves in water. If oxygen is not dissolved, a heterogeneous mix of organic materials in solution and oxygen bubbles in water is formed and requires a prolonged reaction time due to the rate of mass transfer of oxygen from the bubble into the solution, or the reaction of the dissolved organic contaminants with the surface of the oxygen bubbles.

The second reaction chamber of the GPV of the present invention follows sequentially to the first reaction chamber with respect to the flow of the fluid stream, and therefore, receives the fluid stream from the first reaction chamber. The second reaction chamber may be located in the upward, outlet passage of the gravity pressure vessel. In the second reaction chamber, hydrolysis of non-dissolved organic materials refractory to the exothermic oxidation process occurs. By "refractory," it is meant that these organic materials, such as cellulose, were not significantly oxidized during the oxidation process. It will be appreciated, however, that these organic materials, e.g., cellulose, will have been broken up into even smaller fibers or particles since certain other organic materials used to hold the fibers or particles together, namely lignin, will have been at least partially dissolved and oxidized. Notably, because the temperature of the fluid stream has been elevated due to the exothermic reaction that occurred in the first reaction chamber, the hydrolysis reaction of the non-dissolved organic materials is enhanced.

Another embodiment of the present invention improves upon GPVs of the prior art by, for example, enhancing internal heat energy recovery. Recovery of internal heat energy may be enhanced by perpetually cleaning the heat transfer surfaces of the GPV, while centering tubulars positioned therein. By perpetually cleaning the GPV, the accumulation of undesired mineral deposits, dissolved hydrocarbons and other products is also mitigated, further enhancing and enabling overall thermal self-sufficiency. Advantageously, this cleaning of the GPV may be done while continuously conducting primarily heat absorbing endothermic hydrolysis reactions, and without interrupting the flow of the fluid steam.

Figure 1:
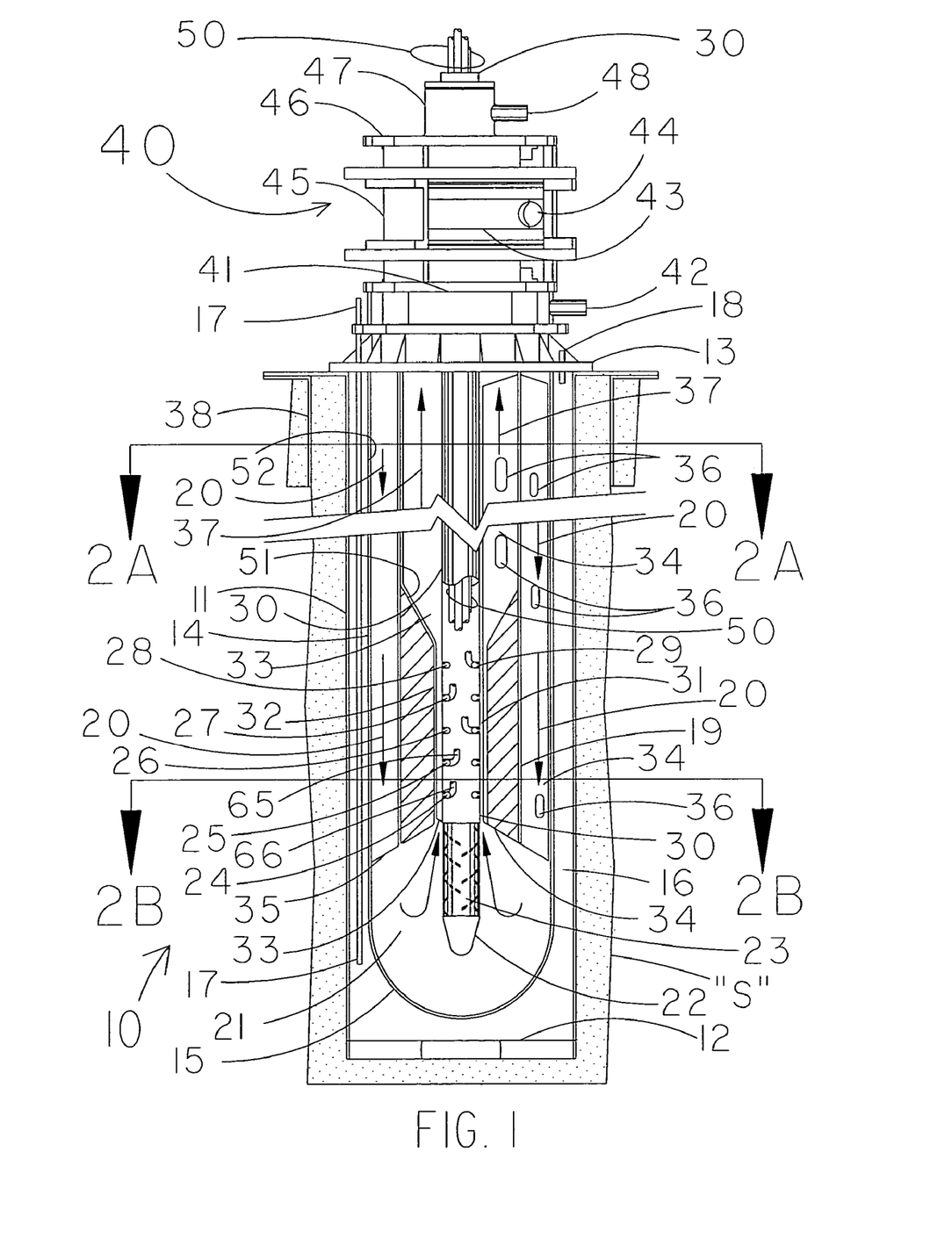
FIG. 1 is a fragmented, vertical elevational view, partially in cross section, of the gravity pressure vessel according to one embodiment of the present invention.

One representative embodiment of a gravity pressure vessel according to the concepts of the present invention is indicated generally by the numeral 10 in FIG. 1. The gravity pressure vessel 10 is defined by first placing a long string containment casing 11 in a conventionally drilled bore hole in the earth's strata designated as "S." In this embodiment, the earth's strata "S" is shown as grout designed to inhibit corrosive action between the steel casing(s) and the grout itself as is typical for this industry. However, it will be appreciated that essentially any material known in the engineering arts as being suitable for holding a GPV 10 may be used. The containment casing 11 is sealed at its bottom 12 and by the lowermost spool 13 of the gravity pressure vessel head-works 40 at its top. Hanging from the lowermost spool 13 within containment casing 11 is an outer wall 14 of the gravity pressure vessel 10. The outer wall 14 is sealed at its bottom 15 and contains the fluid stream within the GPV 10. Containment casing 11 and outer wall 14 define an essentially open annulus 16 which is served by a thermocouple housing tube 17 and a passage 18 which communicates to a vacuum pump (not shown), the housing tube 17 and passage 18 extending through faceplate 13 for communicating with devices, such as the vacuum pump, located outside of the containment casing 11. Annulus 16 may be evacuated to approximately $1/1000$ of an atmosphere to verify the integrity of the outer wall 14 and the containment casing 11 and to mitigate heat losses to the strata. The inner surface of the long string containment casing 11 can be further covered with a material with an emmisivity such that radiant heat from the gravity pressure vessel will be reflected back to the gravity vessel, further mitigating heat losses to the strata. The thermocouple housing tube 17 houses a string of thermocouples to monitor the gravity pressure vessel temperature over the approximate 1600 to 2000 foot (490 to 610 meter) depth of the gravity pressure vessel.

Located concentrically within the outer wall 14 is a heat exchange tubular 19. The outer wall 14 and the heat exchange tubular 19 defines a inlet downward fluids passage 20 which conveys a fluid stream, (also referred to herein as a "feed stream" or "process stream"), of dissolved and suspended (i.e., non-dissolved) solids, including organic materials, downward (in the direction of the arrows located in inlet passage 20) to a first reaction chamber 21. The fluid stream is also being preheated during its downward flow as further explained below.

A feed conduits tubular mandrel tip 22 protects and supports a diffuser 23 as described in U.S. Pat. No. 4,874,560, incorporated herein by reference. Diffuser 23 introduces a selective, but preferably restricted, amount of oxidant to reaction chamber 21 to the now preheated feed stream to be processed. To facilitate start-up, the diffuser 23 may be supplied, via a feed conduit (not shown with respect to the diffuser, but discussed below), with steam to bring the starved wet oxidation reaction chamber 21 up to an adequate temperature to start wet oxidation. It is generally accepted that wet oxidation can be started at about 360° F. (182° C.). This temperature is at or below the desired temperature to accelerate and enhance the yield of the desired hydrolysis reaction and minimizing the requirement for acidification. It will, therefore, be appreciated that, upon partial wet oxidation of some of the dissolved organic materials in the fluid stream, the temperature of the fluid stream will rise to the desired temperature for accelerating and enhancing the yield of the desired hydrolysis reaction conducted subsequently to the wet oxidation reaction.

Above the wet oxidation reaction chamber 21 is a flow accelerated reaction chamber 31 used to induce hydrolysis of non-dissolved organic materials refractory to the oxidation reaction. Sequential to the now upward flow of the fluid stream as shown by the arrow within chamber 21, a gaseous acid, such as sulfur dioxide, sulfur trioxide, or carbon dioxide or a combination thereof, is introduced into the process stream as at, for example, injection point 24, to induce hydrolysis. This gaseous acid flows from injection point 24 from a conduit 66, housed within a conduits tubular jacket 30, also located concentrically within the outer wall 14. It will be appreciated that, in FIG. 1, conduit 66 is not shown through a portion of the conduits tubular jacket 30 in order to provide clarity to other elements in the drawing. However, as best shown in FIG. 2B, conduit 66 extends all of the way to injection point 24.

The acid, as a gas or dissolved in water, mixes with the upward flowing process stream into a flow accelerated reaction chamber 31. These acids are dedicated to the initial lowering of the pH condition of the process stream to be treated in the flow accelerated reaction chamber 31. Reaction chamber 31 is defined between extended inner surface 32 of the heat exchange tubular 19 and the conduits tubular jacket 30. The extended inner surface 32 of the heat exchange tubular 19 creates a more narrow passage between the heat exchange tubular 19 and the conduits tubular jacket 30. Because of the narrowing of the passage at reaction chamber 31, the flow of the fluid stream will necessarily be accelerated, providing for better control of the hydrolysis reaction occurring there.

Immediately sequential to injection point 24 in the flow path of the process stream through reaction chamber 31 is an additional injection point 25 which may introduce the same or other acids, including but not limited to sulfuric acid, maleic acid or combinations thereof. Injection point 25, like injection point 24, is fed by a separate conduit, such as 65, within conduits tubular jacket 30. The next sequential stages of the reaction chamber affording the initiation or, more likely, the quenching of the reaction may be accommodated by addition of one or more other fluids or mixtures from injection points 26, 27, or 28. Similar to injection points 24 and 25, these injection points 26, 27 and 28 are separately fed by conduits, such as 61, 62 and 63, within conduits tubular jacket 30. In a preferred embodiment for quenching the reaction, a mixture of alkali and precipitant salts of the quenching chemical may be fed to reaction chamber 31 through one or more conduits separately leading to any one or more of injection points 26, 27, or 28. The fluids or mixtures delivered to the reaction chamber 31 quench and arrest the hydrolysis reaction.

It will be appreciated that the injection points 26, 27 and 28 are spaced apart from each other and at different distances from the injection points 24 and 25 by design to provide the operator with means to introduce sequential chemical feeds to initiate and then quench the hydrolysis process. The sequential introduction of chemical feeds supplements the option to change the time interval between initiation and quenching of the hydrolysis reaction by varying the rate of flow. That is, by changing the injection point at which activation of a particular chemical feed to the flow stream occurs, the distance between the point of initiation of the hydrolysis reaction and the point of quenching of the hydrolysis reaction can be altered without interrupting the processing of the flow stream. Adjustment of the point of initiation and the point of quenching of the hydrolysis reaction further enables the operator to elect the length of the hydrolysis reaction for adaptation to particular raw materials feed flow. It also provides the operator with greater control over the process where divergent recipes of raw materials may be employed one after another. Still further, the operator may now have the ability to produce alternative finished products from the hydrolysis process.

Each of the injection points 24, 25, 26, 27, and 28 is equipped with one or more orifice passages 29 which operatively and selectively communicate between the injection points 24, 25, 26, 27, and 28 and the reaction chamber 31. The number, size and placement of the orifice passages 29 may be varied in design in order to provide a uniform feed of injected fluids and mixtures into the reaction chamber 31.

Besides the multiplicity of delivery conduits 61, 62, 63, 65 and 66 and as more particularly shown in FIG. 2, the conduits tubular jacket 30 also includes a steam heat energy or oxygen delivery conduit 64, a thermocouple string housing conduit 67, and a conductor for cathodic protection 68. Conduits 61, 62, 63, 65 and 66 communicate between the chemical fluids supply at the ground surface above and the injection points 24, 25, 26, 27 and 28. In a preferred embodiment, no two conduits are the same size so as to identify at the ground surface which conduit serves which injection point or other purpose. That is, each conduit has a diameter different from that of every other conduit. Thermocouple string housing conduit 67 is sealed at its bottom to accommodate a dry space for a plurality of thermocouples to monitor the gravity pressure vessel thermal profile from top to bottom in a manner similar to thermocouple housing tube 17. The thermocouple string is intended to be retrievable for replacement purposes. The central conduit 64 is convenient to serve the requirements to operatively communicate with and deliver steam and/or oxygen to the first reaction chamber 21. This facilitates the start-up of the GPV. The space within the conduits tubular jacket 30 exclusive of the conduits 61 through 67 may be filled with an inert gas or a vacuum as dictated by the needs of feed preheating and/or insulation to accommodate the needs of thermal equalization or steam delivery with minimal steam condensation as required for operation of the GPV 10.

The upper end of the flow accelerated reaction chamber 31 is defined by an angled surface 51 on the heat exchange tubular 19 proximate to surface 32 to function as a guide to center the placement of the tubular jacket 30 in conjunction with mandrel guide 22. The treated fluid stream then continues upwards (as shown by the direction of the arrows) through outlet upward fluids passage 37 defined by the heat exchanger tubular 19 and the conduits tubular jacket 30.

Figure 2A:
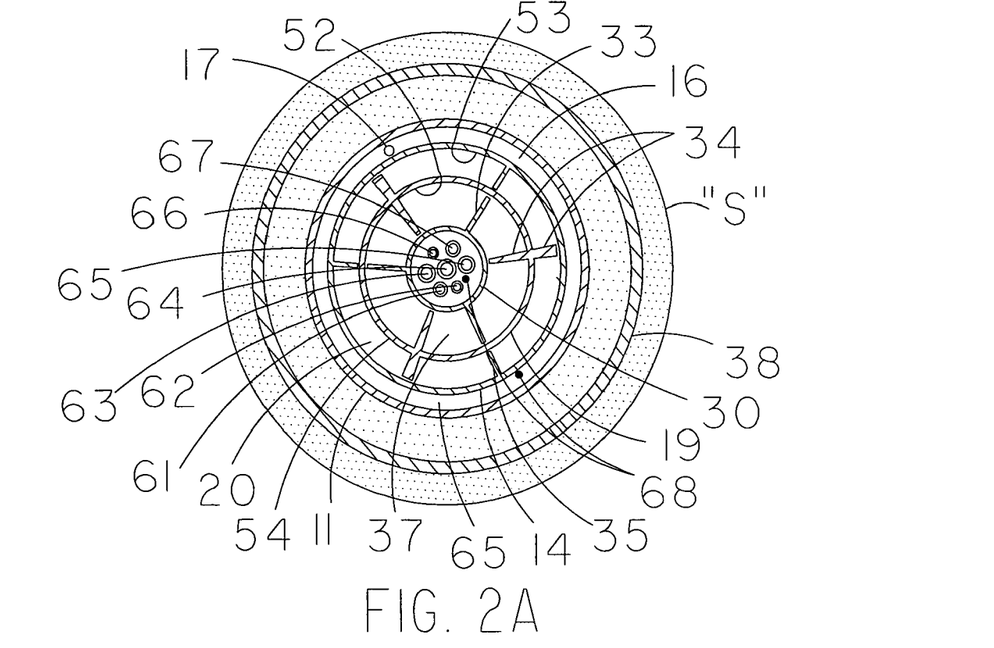
FIG. 2A is a cross sectional view taken along the section line 2A—2A of FIG. 1.
Figure 2B:
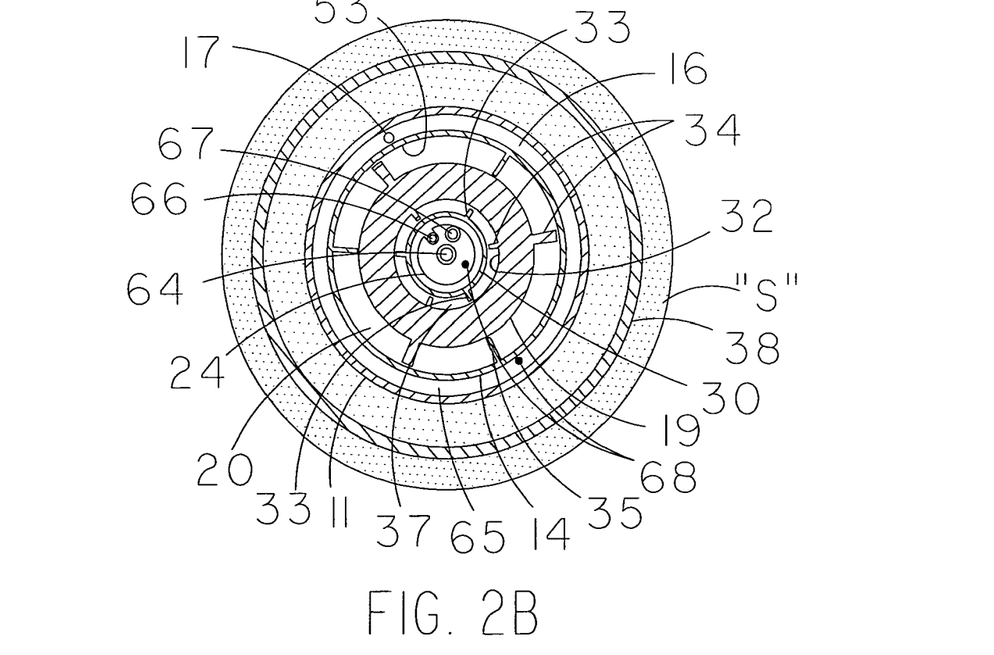
FIG. 2B is a cross sectional view taken along the section line 2B—2B of FIG. 1.

As shown in FIGS. 1, 2A and 2B, one or more cleaning blades 33 may be affixed to the tubular jacket 30 to clean the inner surface 32 of the heat exchange tubular 19 at the flow accelerated reaction chamber 31 and the inner surface 52 of the heat exchange tubular 19 directly above the reaction chamber 31. Blades 33 are intended to sweep mineral deposits and other solid contaminants from the inner surface of the heat exchange tubular 19.

One or more cleaning paddles 34, extending both radially inward and outward of heat exchange tubular 19, may be affixed thereto and protrude into the fluid passages 20 and 37. The radially inward directed paddle 34 may further extend inward from the extended inner surface 32 of the heat exchange tubular 19 of the gravity pressure vessel 10. These paddles 34 are used for the purpose of keeping all of the surfaces of the conduits tubular jacket 30 and the inner surface 53 of the vessel outer wall 14 substantially clean. In other words, at least the paddles are used to sweep many deposits from the fluid passages 20 and 37. In the embodiment shown in FIGS. 2A and 2B, there are three cleaning paddles 34 that are part of the heat exchange tubular 19. These paddles 34 extend proximate to the inner surface 53 of outer wall 14 and the conduits tubular jacket 30 for essentially the entire length of the outer wall 14 and conduits tubular jacket 30. Each inboard paddle 34 is preferably radially aligned with a respect outboard paddle 34, with each paddle also being circumferentially spaced from blades 33 and as noted below, blades 35.

Furthermore, one or more blades 35 may be affixed to the inner surface 53 of the vessel outer wall 14 to extend proximate to the heat exchange tubular 19 to keep the outer surface 54 of the heat exchange tubular 19 clean. That is, the blades 35 are intended to sweep contaminant deposits from the surface of the heat exchange tubular 19. The relationship of the cleaning paddles and blades with respect to each other can be more particularly seen in FIG. 2A. As shown, blades 33 and 35 are positioned to radially align with each other and to be circumferentially spaced from the cleaning paddles 34 for the entire depth of the heat exchange tubular of the gravity pressure vessel. The relationship of the paddles 34 and the blades 33 and 35 must be maintained over the depth of the gravity pressure vessel. It is also observed that the joints connecting each length of heat exchange tubular 19 must be welded in place as the usual threaded joint could not be rotated to be joined with the heat exchange tubular 19 in position.

Spaced along the cleaning paddles 34 are openings 36 to accommodate the release of fluid mixtures with particulate in suspension from between the paddles 34 and the fixed blades 33 and 35. The openings 36 also accommodate intermixing in upward flowing fluids passage 37 defined between the tubular jacket 30 and the heat exchange tubular 19.

In the embodiment in FIGS. 2A and 2B, three paddles 34 are illustrated, but any number of paddles may be selected. In the present invention, heat exchange tubular 19 is supported and driven in a manner that will allow its slow and high torque continuous rotation in a clockwise and counter clockwise fashion through one third of a circle to sweep soft deposits from the fluid passages 20 and 37 of the gravity pressure vessel. The support assembly for the heat exchange tubular 19, which also allows for the rotation of the same, will be further described below with respect to FIGS. 3A and 3B.

The rotational rate of travel of the paddles 34 on the heat exchange tubular 19 may be set automatically or manually driven to limit the amount of deposits that may occur on the walls of the tubulars to an acceptable level. Many or most deposits will be cleared from the passages. However, it is possible that thin layers of deposits may still exist on the tubulars inasmuch as the paddles may not necessarily scrape all deposits from the tubular elements. These deposits are considered to be de minimus for purposes of this invention as will be explained below.

In the preferred embodiment shown, the rate of travel with three paddles 34, three outlet passage blades 33, and three inlet passage blades 35 may be as slow as 118 degrees every 24 hours or as fast as every 8 hours. It is noted that, because of the thickness of the paddles and the blades, a one-third turning of the paddles is not theoretically possible. Hence, it will be understood that by turning the heat exchange tubular about one-third of a circle, the tubular will actually turn a couple of degrees short of exactly one-third of a circle. Similarly, were the GVP to have two paddles, two outlet passage blades appropriately aligned and spaced, and two inlet passage blades, the tubular would actually turn just short of one-half of a circle (180 degrees), or approximately 178 degrees.

Cleaning the GPV using this invention further provides a more consistent daily operation. In the prior art, cleaning the surfaces of the GPV with nitric acid every 5 to 10 days results in a wide range of internal heat recovery by updraft to downdraft heat energy transfer, making consistent operation very difficult. A ten-fold change in heat recovery rate directly after acid cleaning, to one-tenth that at the end of the operation cycle when cleaning is needed, need to be compensated for by reduction of the production rate to sustain thermal efficiency. Although cleaning of the GPV as directed in the present invention may not be as pure as acid cleaning, because the GPV is cleaned using the paddles/blades much more frequent, a higher overall average internal heat energy recovery rate is gained, and it is much more consistent.

As shown in FIGS. 1, 2A, and 2B, and as would typically be required for the drilling of a bore hole for the gravity pressure vessel 10, a setting casing 38 may be positioned to protect the water bearing aquifers prior to drilling the borehole for the long string containment casing 11. The strata forming the bore hole, shown as "S", also accommodates the setting casing 38 as well as the long string containment casing 11 set concentrically inward of setting casing 38.

Figure 3A:
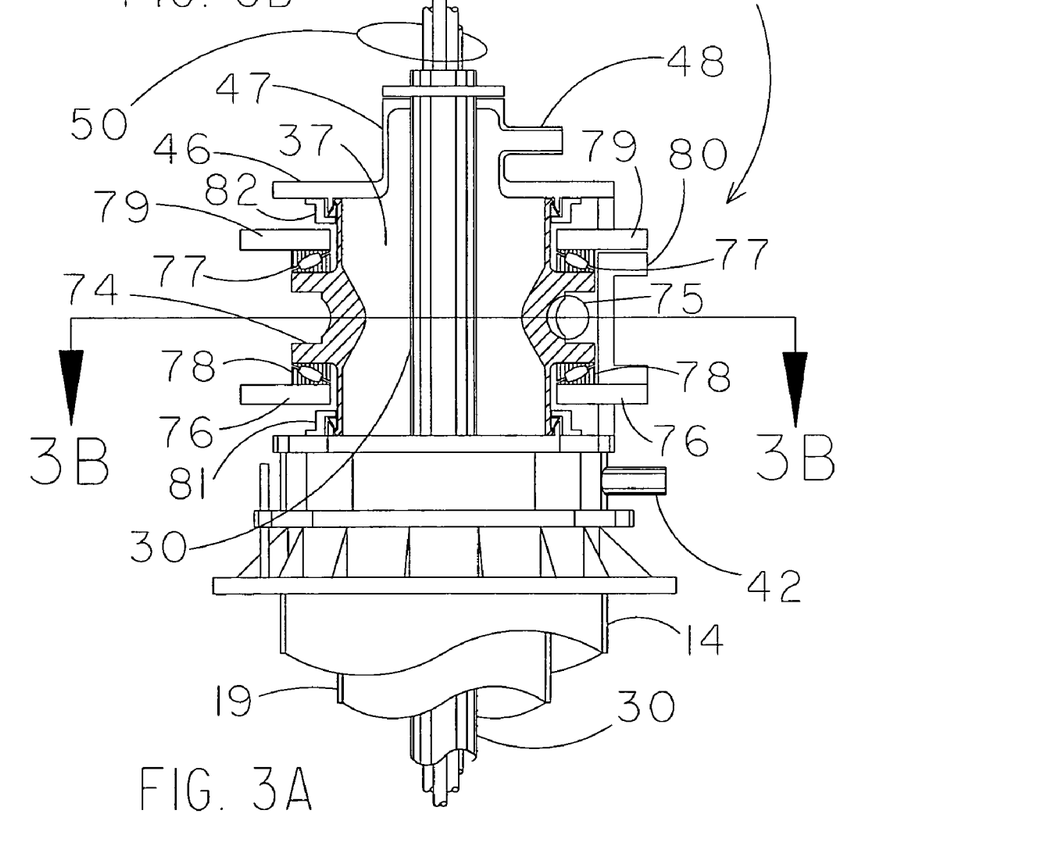
FIG. 3A is a fragmented, vertical elevational view, partially in cross section, of a portion of the gravity pressure vessel particularly showing the head-works whereby the heat exchange tubular can be sealed, supported and rotated.

Turning now to the head-works generally indicated by the numeral 40 in FIGS. 1 and 3A, it will be appreciated that the head-works 40 essentially serves the gravity pressure vessel 10. The head-works base is shown as the lowermost spool 13, supporting the feed spool 41 fed by pipe 42, which communicates with downward fluids passage 20. Feed spool 41 supports the turning apparatus spool 43 turned by drive 44 and structurally bypassing the turning drum at stanchions 45 to upper ring 46. Ring 46 supports the fixed spool 47, which communicates with a process outlet pipe 48. Passing through the head-works 40 and supported by spool 47 is the conduits tubular jacket 30, the lower portion of which was previously described in the gravity pressure vessel 10. Within the conduits tubular jacket 30 are a multiplicity of servicing conduits, designated generally as 50, which were more fully described above. The head-works itself will be more particularly described in greater detail with respect to FIGS. 3A and 3B.

Figure 3B:
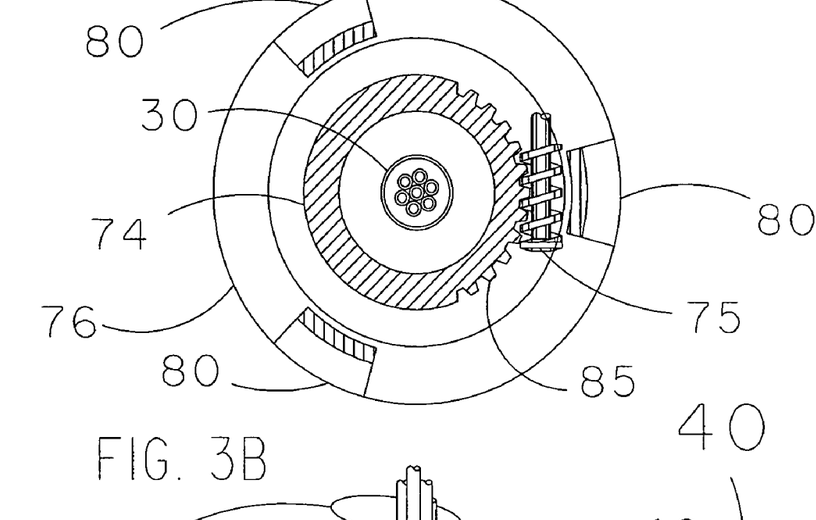
FIG. 3B is a cross sectional view taken along the section line 3B—3B of FIG. 3A.

In FIGS. 3A and 3B, the support assembly for driving, sealing and rotating the heat exchange tubular 19 is shown in the head-works 40 of the GPV 10. It will be appreciated that, as shown in FIG. 2A, the heat exchange tubular 19 can be continuously rotated back and forth in both a clockwise and a counter clockwise direction between the blades 33 and/or 35 so that the cleaning paddles 34 affixed to the heat exchange tubular 19 can clean many deposits from at least the fluid passages 20 and 37 of the GPV 10. Again, not necessarily all deposits will be removed, but most will be by the reciprocating turning of the heat exchange tubular 19. Given that the embodiment shown includes three equally spaced blades 33 fixed to the stationary conduits tubular jacket 30 and three identically spaced blades 35 fixed to the stationary outer wall 14, the heat exchange tubular 19 with its cleaning paddles 34 can be rotated one third of a complete rotation in each direction.

With respect to the operation of the heat exchange tubular 19 as shown in this embodiment, a block ring 74 supports the weight of the rotating heat exchange tubular 19, while a worm gear 75 drives it. The rotational positioning of block ring 74 can be accommodated by one or more hydraulic rams or any other means generally accepted in engineering practice that would accommodate the reversing action of the cleaning paddles 34 between the opposing blades 33 and 35 shown in FIG. 2A. The block ring 74 is supported by structural lower ring 76 and upper ring 79 through upper roller bearing 77 and lower roller bearing 78. A set of three structural stanchions 80 support rings 76 and 79 and are configured to allow shim and gap adjustment to allow firm support of the roller bearings 77 and 78. It is noted that other means for supporting and moving the heat exchange tubular 19 besides roller bearings 77 and 78 may be used in the present invention without departing from the scope thereof.

The rotating heat exchange tubular 19 is shown as being sealed to the fixed head-works components at lower ring seal 81 and upper ring seal 82. Again, however, several alternative means for sealing the heat exchange tubular 19 are known in the art, such as packing, O-rings, or mechanical seals, and the present invention should not necessarily be limited thereto. Nevertheless, the devices illustrated have the advantage of being repairable without disassembly of the entire head-works 40 of the gravity pressure vessel 10.

During rotation of the heat exchange tubular 19 and its block ring 74, updrafting processed fluids from the process stream of the gravity pressure vessel pass through outlet passage 37 into the upper spool 47 and out through pipe connection 48. The service conduits 50 are supported from the upper spool 47 in a manner that will allow adjustment of the hydrolysis initiation and quenching reactions within the flow accelerated reaction chamber 31 during normal operation. The conduits tubular jacket 30 is also supported by upper spool 47 and provides for the alignment of the cleaning paddles 34.

With respect to the turning of the heat exchange tubular 19, FIG. 3B shows one embodiment illustrating how this can be done. In FIG. 3B, ring block 74 has teeth 85 cut to accommodate the worm gear drive 75. Also illustrated are the respective positions of three supporting stanchions 80.

It should be noted that the heat exchange tubular 19 is preferred over the outer wall 14 and/or the conduits tubular jacket 30 for rotational movement to effect cleaning of the GPV because it is the least stressed by axial or internal tension or compression. Heat exchange tubular 19 is only required to support its weight hanging in water and has greater reserve strength to accommodate the stress of torsional force as may be needed for rotational movement to effect cleaning of the GPV. Again, it will be appreciated that rotation of the heat exchange tubular is only at a very gradual pace of about third of a rotation per hour.

By way of example, a heat exchange tubular 19 may be about 0.322 inches thick (0.8179 cm) and about 8⅝ inches (21.91 cm) in outside diameter. If made of stainless steel, it would have a total weight in water of about 50,000 pounds (22,680 Kg) acting on about 8.399 square inches (54.19 square cm) of cross sectional area. This is considered adequate to accommodate the reserve strength necessary for the torsional forces involved in continuous cleaning of the GPV. It will be further appreciated that the force required to rotationally displace the cleaning devices would be indicative of the accumulations of debris of the vessel walls, all other parameters being equal. Thus, it would be practical to control the rate of rotational cleaning to sustain a given degree of heat exchange and flow rate cleanliness.

As an example of the ability of the disclosed embodiment of the GPV to sustain the heat requirement of the GPV and in order to show the GPV in operation, the following example is provided using a relatively simplified analysis. It will be recalled that the diffuser 23 may supply reaction chamber 21 with steam via central conduit 64 extending upwards from the diffuser 23 to facilitate start-up of the GPV. Once started, the diffuser 23 will introduce a restricted amount of oxidant into the reaction chamber 21 to react with the fluid stream to be processed. A typical mixture to be fed into the GPV, and more particularly, to the reaction chamber 21, is provided wherein 10% municipal solid wastes suspended in water may comprise the following materials:

| | |
|---|---|
| 1.) Cellulosic materials | 60% |
| 2.) Lignin | 15% |
| 3.) Inert Solids | 10% |
| 4.) Dissolved Carbohydrates | 6% |
| 5.) Other organics | 9% |

Of these materials, the cellulosic materials, inert solids, and constituents of the "others" category are suspended (i.e., non-dissolved) particles and tend to respond slowly, if at all, to the effects of wet oxidation at temperatures conducive to very weak acid hydrolysis, typically around 450° F. (230° C.). As described above, the initial step following introduction and preheating of the fluid stream in the GPV involves the partial wet oxidation of certain undesired organic materials, such as lignin, dissolved in water at these temperature conditions conductive to weak acid hydrolysis within a first reaction chamber 21.

The heat content of the lignin is such that, at 1.5% of the weight of water, the lignin will generate an amount of heat equal to raising the temperature of one pound of water more than 50 degrees Fahrenheit (10 degrees Celsius). It therefore follows that only a portion of the lignin will have to be oxidized to meet the terminal temperature heat requirements of the GPV, which is normally in the range of from about 10 degrees Fahrenheit to about 20 degrees Fahrenheit, although this range can vary widely depending upon the processing conditions and other factors in the GPV.

Sufficient oxidant may be fed via diffuser 23 to maintain overall thermal self-sufficiency of the hydrolysis GPV, leaving the cellulosic fiber in a condition for further treatment via very weak acid hydrolysis in the second reaction chamber 31. Unlike other sub-critical wet oxidation reaction chambers in GPVS, the starved wet oxidation chamber 21 is only intended to deal with dissolved organic materials and, as such, does not have to provide for larger volumes of process materials. In other words, the wet oxidation reaction is not seeking to burn everything available to be oxidized. Thus, a greatly extended reaction chamber is not required. It should, however, be large enough to provide sufficient oxidation so that the fibrous structure of the cellulose can be fragmented or exploded to allow access for hydrolysis of the cellulosic and semi-cellulosic materials or condition the cellulosic materials for post treatment enzyme hydrolysis. It should also be noted that less than stochiometric oxygen, which may be required for full lignin oxidation, may be manipulated to convert the lignin itself to a desired lignin-based, partially-oxidized intermediate or end product for later extraction and use, while producing beneficial heat from partial oxidation. Based upon the foregoing disclosure, it should now be apparent that the use of a multiple function, i.e., wet oxidation and hydrolysis, gravity pressure vessel with the associated means to sustain heat exchange efficiencies described herein will carry out one or more of the aspects set forth for the present invention.

In turn, because many raw waste material streams fed into GPVs include some desirable dissolved organic materials such as disaccharides and monosaccharides, and these dissolved organic materials are susceptible to attack by the introduction of oxygen into the GPV of the present invention, the present invention provides a further embodiment for utilizing the wet oxidation/hydrolysis GPV during the processing of a fluid stream, but permitting the separation of the desirable dissolved organic materials from the raw materials fluid stream prior to processing through the GPV. It is further envisioned that these separated desired dissolved organic materials may be reintroduced into the fluid stream after the fluid stream has been processed through the GPV.

Figure 4:
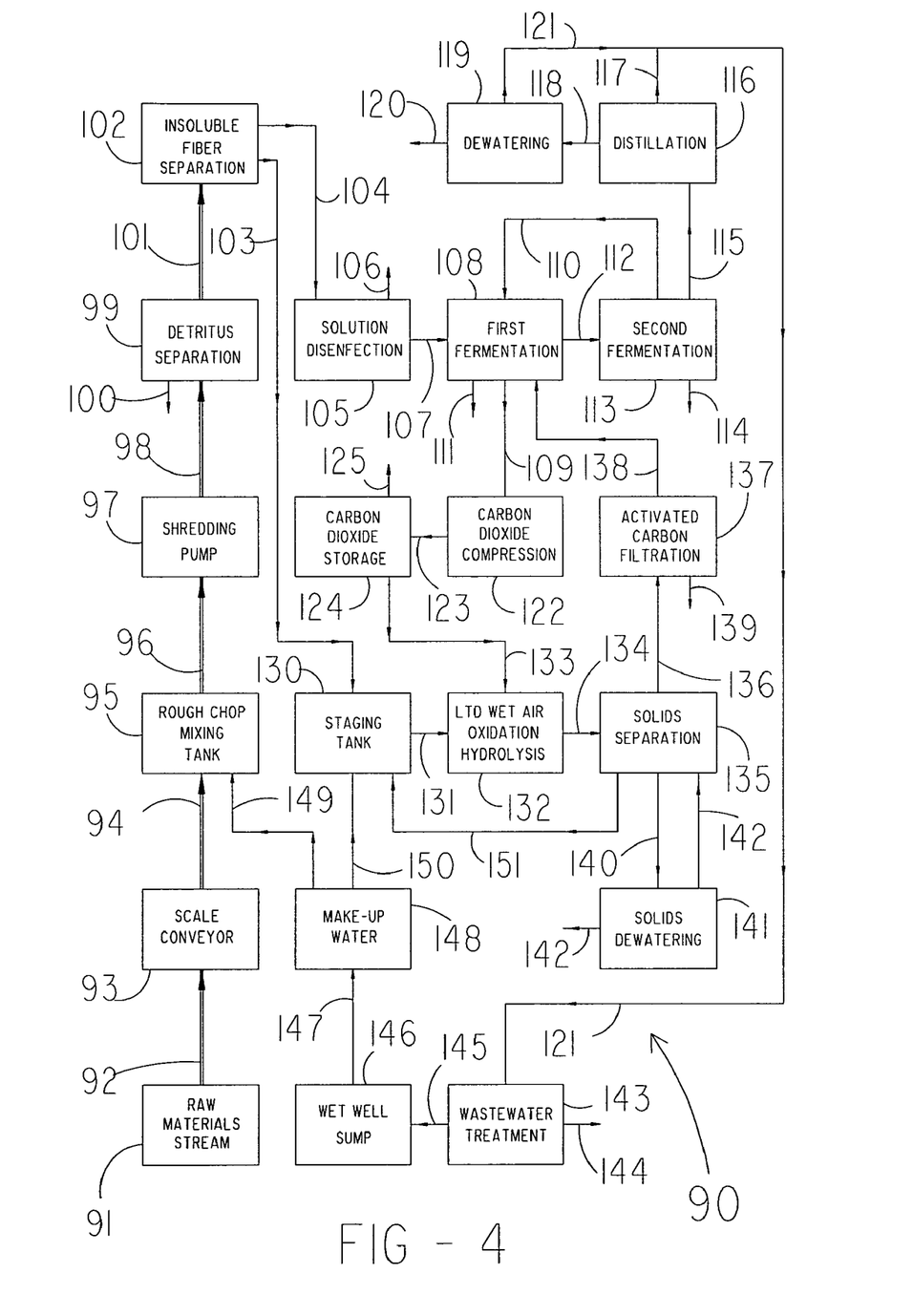
FIG. 4 is a schematic diagram of the separation and bypass process described as a further embodiment of the present invention.

Therefore, as shown in FIG. 4, an overall process and system for dealing with the issue of separation of desirable dissolved organic materials in the present invention is schematically presented generally as the numeral 90. It should be understood that, for purposes of this invention, particularly with respect to the schematic representation in FIG. 4, appropriate conduits, pumps, devices, storage equipment, and other apparatus are employed to move material between the various stages of the system 90. It should be further understood that the process which converts raw waste materials to desired materials is a continuous process, and therefore, one of skill in the art will readily understand that various pumping devices and storage areas will be employed to maintain the process in continuous operation.

In one particular use, raw materials containing desirable organic materials, both dissolved and non-dissolved, may be obtained from municipal solid wastes, generally after the extraction of marketable goods. Raw materials can be obtained from any source known in the art however, including but not limited to waste pulp from paper factories, spent cellulose from paper recycling plants, and refuse from food processing plants. Municipal solid wastes are commonly referred to as residual fluff and generally includes paper scraps, lawn wastes, newsprint and cardboard, packaging wastes, wood and food wastes, all of which are usually rich in cellulosic content.

In any event, raw materials are typically delivered to the site and mixed with water in a manner well known in the art to create a raw materials stream 91. The raw materials stream 91 is conveyed via 92 to a continuous scale devise 93 as necessary to determine the mass rate of flow and the proportioning of the various fluid streams according to the process recipe. At this point, the process stream enters a closed system whereby all process steps are no longer open to the air to better manage the containment of materials and ensure the mitigation of odors or emissions to the atmosphere, thus protecting the workers from contact with the process stream and protecting the environment. The materials then advance via conveyance 94 to a mixing tank 95 incorporating means to roughly chop the materials to be processed into flakes and bits of organic debris. Sufficient water may be added to produce a fluid stream that is approximately 10% suspended insoluble solids in a water and dissolved solids mixture. For some raw materials recipes, such as a waste stream very rich in fruits and vegetable matter, the water content of the raw stream may be sufficient to provide the required percentage of water fluid to permit the manipulation and handling of the process stream using piping techniques well known in such arts.

The fluid stream with its suspended and dissolved solids then advances through the process as at conduit 96 to a shredding pump 97 which further reduces the size of the suspended solids to flakes and bits roughly ¼ inch in largest dimension. The prepared stream is then advanced via conduit 98 to a detritus separation devise 99 that removes solids that are greater or lesser than the density of water by more than 5% of the density of water under the extant process conditions of temperature at that point. It should be appreciated that warmer waters tend to be less viscous and accommodate such separation in a more expedient and efficient manner. Solids thus removed as at 100 may then be further separated for salvage value as they may contain various metals, grit, glass or plastics that can be recovered for reuse.

The undesired, substantially denser-than-water and substantially less denser-than-water components of the raw materials stream thus removed, the process flow advances via conduit 101 to a screen separation device 102 to remove the insoluble bits and fibers that may be present in the stream at that point in the process. Separation may occur by any means known in the art, including but not limited to a belt press, vacuum filter, micro-strainer, or other solids filter selectively removing suspended materials according to the design of the persons normally skilled in such arts. The process stream is thus split at this point. The insoluble portion, having some small amount of dissolved solids, advances via conduit 103 to a staging tank 130, while the soluble portion of the fluid stream, along with some very small percentage, e.g., from about 0.5 to about 1 percent for most equipment, of suspended solids, advances via conduit 104 to a disinfection stage 105. It should be noted that the insoluble fraction may be washed with clean water at this point of separation as may be required to sustain the filtration devise and to enhance the separation of the soluble fraction by combining the rinsed waters with fluid stream along conduit 104 as would be well known to those practiced in such arts.

The dissolved materials stream is essentially a mono- and disaccharides-rich stream with some small particle insoluble saccharides. Disinfection of the stream may occur using any means known in the art including, but not limited to ultraviolet radiation or some other disinfection requiring minimal energy that does not chemically alter the fluid stream components. Disinfection by chlorination is not recommended and, in fact, counter-indicated because when the process stream is comprised or organic vegetable or paper materials it will contain lignin components or other such debris that might be capable of producing undesired chlorinated hydrocarbons. Thermal disinfection may be practiced provided energy use is limited to practical levels and retention times managed so as to mitigate the impact of capital costs on the process economic efficacy and usefulness.

At this point a fraction of the disinfected saccharides-rich solution stream may be extracted at 106 and processed by further separation as a source of raw materials for the production of valuable products such as lactic acid or other products derived from glucose or other soluble saccharides, as would be known in the art. The unused portion of the extraction could then be returned to the outlet stream 107 for further benefit to the process herein described.

The soluble saccharides-rich stream thus advances via conduit 107 to a first stage fermentation as at 108 where a portion of the saccharides, amenable to metabolism by a selected strain of fungi, can be digested producing economically viable byproducts including but not limited to ethanol and carbon dioxide. The carbon dioxide would be extracted as a gas via closed conduit 109 for further processing. Carbon dioxide gas for the process system may be introduced to the fermentation vat at the bottom of the fermentation vat 108 in bubble form via conduit 110 to serve as a way in which to agitate and mix the fermentation process to improve yield and accelerate the digestion process. The valuable yeast with other dregs removed from the fermentation may be extracted at conduit 111 for further processing or reuse. It should be noted that ethanol may also be extracted from the first stage fermentation; however, as a general rule, the strength of the ethanol solution may not be of sufficient concentration at this point in fermentation vat 108 to inhibit or retard the fermentation process.

The first fermentation result then advances via conduit 112 to a second fermentation vat 113 where a second strain of fungi is introduced which has a metabolic affinity to those saccharides that may be refractory to the metabolism of the first selected strain of fungi in fermentation vat 108. Carbon dioxide gases generated by the metabolism of the saccharides would be extracted at extraction point 110 and a concentrated extract of that particular strain of fungi, i.e., yeast, used for the second stage fermentation vat 113 would be extracted for recycling or beneficial use at extraction point 114.

It will be understood that the production of yeasts, either at fermentation vat 108 or fermentation vat 113, or even at a third or fourth stage of fermentation, if so elected, may be enhanced by the introduction of a controlled percentage of oxygen to the fermentation procedures. It will be appreciated however that the absence or limitation of oxygen is a condition whereby the production of ethanol may be enhanced.

After fermentation in fermentation vat 113, the saccharides-exhausted stream is conducted via conduit 115 to a distillation or other process to extract valuable products at stage 116. Water extracted is removed for further use or treatment at conduit 117, and ethanol or extracted fluids advance via conduit 118. Ethanol from distillation stage 116 typically still contains moisture or other contaminants. Consequently, the ethanol can be further processed primarily to remove water at dewatering stage 119 using any method known in the art to accomplish that procedure, including but not limited to Zeolite, membrane separation, or even further distillation procedures. The finished useful products are collected through conveyance 120 and the extracted water is conveyed via conduit 121 for further treatment.

Returning to the fermination stages and the carbon dioxide extracted from the fermentation procedures and conveyed via conduit 109, the carbon dioxide is conveyed to a device 122 to compress and liquefy the carbon dioxide. The liquefaction procedure is a way to clean the carbon dioxide of undesired gases and frozen semi-solid volatile organic compounds which may then be extracted. The clean carbon dioxide then advances as by conduit 123 to storage 124 for extraction and transport by means 125 for beneficial uses. A portion of the pressurized carbon dioxide may be used for weak or mild acid hydrolysis in the gravity pressure vessel in accordance with the current invention.

Returning to the conduit 103 as shown in FIG. 4, that portion of the original process stream rich in insoluble saccharides and their polymers such as cellulosic materials, advance to a staging tank 130 wherein sufficient water is joined to the process stream to produce a water suspension that can be piped. For this disclosure, it may be assumed that between 5% and 15% suspended solids will provide a suitable water suspension for most practical applications. The water suspension would thus advance via conduit 131 to the gravity pressure vessel 132 as in the present invention described herein. Carbon dioxide is fed to the gravity pressure vessel 132 by conduit 133 in a controlled mass flow rate manner.

The processed stream from the gravity pressure vessel 132 according to the present invention thus advances via conduit 134 to a device 135 for separating the produced insoluble solids. Such a device 135 would typically be a clarifier of the type commonly used in the wastewater treatment, except that this particular clarifier would be enclosed so as to capture any carbon dioxide, gas or odors as may be produced by the gravity pressure vessel 132 reactions. The processed fluid stream, cleaned of most of the inert solids, then advances via conduit 136 to a second stage cleaning at an activated carbon filter 137 for the removal and extraction of beneficial byproducts that happen to be inhibitory to the further intended steps of the fermentation of the GPV-produced, simpler and de-polymerized saccharides. The processed stream, including its solution of simpler saccharides thus advances via conduit 138 to join the first stage fermentation steps as at fermentation vat 108 described hereinabove.

The by-products preferentially extracted by activated carbon may include, but are not be limited to, furfural, phenolic materials and acetic acid. The by-products would then be extracted via conduit 139 for recovery via activated carbon regeneration procedures and secondary processing not shown but as known to those skilled in such art. The subnatant of the clarifier 135 is conveyed therefrom at conveyance 140 to a means 141 for further concentrating the inert solids. Any purged solution still containing significant portions of the produced simpler saccharides may be returned to the fluid stream at the outlet of clarifier 135. Solids thus dewatered and purged in separation devise 141 are extracted for beneficial use at conveyance 142.

The multiple sources of extracted waters collected via conduit 121 are conveyed to a wastewater treatment 143, which may use return activated aerobic digestion in combination with anaerobic digestion, which can produce extracted methane for beneficial use. A portion of the treated water may be discharged via outlet 144 with separated organic debris added to the raw materials stream at staging tank 130 (not illustrated). A portion of the treated water would then be conveyed via conduit 145 to a general purpose wet well sump 146 for reuse in the process as required. Water so used would be conveyed via conduit 147 to a make-up water surge tank 148 that, in turn, would deliver water in a controlled proportion via conduit 149 to the incoming raw materials mixing tank 95. Another fraction of the make-up water would be conveyed via conduit 150 to serve the blending needs of the staging tank 130. The operation of the process may also be benefited by recycling the processed water solution directly from the solids separation devise via conduit 151 back to the staging tank 130 as would be appropriate depending on the desired cooking recipe of the GPV 132.

As taught and claimed herein the election of the unique combinations of process steps involved is specifically orientated so as to minimize the requirements for energy to convert the chemical energy present in the raw materials stream to those forms of energy or products that have the highest and best use of the waste products raw materials stream, and to enhance the usefulness of those waste products. This disclosure further illustrates the useful aspects of the invention described herein. Further, by splitting the stream as described herein, the tendency of the hydrolysis process to damage simple saccharides can be mitigated to further enhance the usefulness of the procedure.

It is, therefore, to be understood that any variations evident fall within the scope of the claimed invention and thus, the selection of specific utilization of multiple function gravity pressure vessel with the associated means to sustain heat exchanger efficiencies, its operating conditions and the like, can be determined without departing from the spirit of the invention herein disclosed and described. Thus, the scope of the invention shall include all modifications and variations that may fall within the scope of the attached claims.

What is claimed is:

1. A method for processing a fluid stream containing dissolved and non-dissolved organic materials through a gravity pressure vessel having heat energy requirements comprising the steps of:
   introducing the fluid stream downward into the gravity pressure vessel;
   partially oxidizing the dissolved organic materials of the fluid stream in a first reaction chamber of the gravity pressure vessel to substantially sustain the heat energy requirements of the gravity pressure vessel;
   subsequently inducing hydrolysis of at least one non-dissolved organic material within the fluid stream, and thereafter, quenching the hydrolyzed material within the fluid stream; and
   carrying the fluid stream containing the hydrolyzed material from the gravity pressure vessel.

2. The method of claim 1, wherein the step of partially oxidizing fully sustains the heat energy requirements of the gravity pressure vessel, and generates substantially no excess heat energy.

3. The method of claim 1, wherein the step of partially oxidizing sustains at least 50 percent of the heat energy requirements of the gravity pressure vessel.

4. The method of claim 1, wherein the step of introducing the fluid stream includes preheating the fluid stream during its downward flow.

5. The method of claim 1, wherein the step of partially oxidizing includes wet oxidizing of at least some of the dissolved organic materials of the fluid stream.

6. The method of claim 1, wherein the step of partially oxidizing includes introducing a selective amount of oxidant into the first reaction chamber to react with at least the dissolved organic materials of the fluid stream.

7. The method of claim 6, wherein the step of introducing the oxidant restricts the amount of oxidant used is such that all the oxidant used before the dissolved organic materials are oxidized.

8. The method of claim 6, wherein the step of partially oxidizing further includes inducing pressure in the first reaction chamber that is greater than the saturation pressure consistent with peak temperatures in the first reaction chamber.

9. The method of claim 1, wherein the step of partially oxidizing creates an exothermic reaction that provides heat energy to the fluid stream in the first reaction chamber, thereby increasing the temperature of the fluid stream.

10. The method of claim 1, wherein the step of inducing hydrolysis includes introducing an acid into the fluid stream and wherein the step of quenching includes introducing an alkali into the fluid stream.

11. A method for substantially cleaning deposits from fluid stream passages within a gravity pressure vessel, the method comprising:
   providing a gravity pressure vessel including
      an outer wall for containing the fluid stream within the gravity pressure vessel;
      a conduits tubular jacket located concentrically within the outer wall; and
      a heat exchange tubular located concentrically between the outer wall and the conduits tubular jacket, the heat exchange tubular having a first paddle extending radially outward toward the outer wall and into a first fluid stream passage and a second paddle extending radially inward toward the conduits tubular jacket and into a second fluid stream passage, wherein the heat exchange tubular is rotatable with respect to the outer wall and the conduits tubular jacket; rotating the heat exchange tubular such that first and second paddles sweep deposits from the fluid stream passages.

12. The method of claim 11, wherein the gravity pressure vessel includes
   at least one first blade affixed to the outer wall and extending into the first fluid stream passage proximate to the heat exchange tubular;
   at least a second blade is affixed to the conduits tubular jacket and extending into the second fluid stream passage proximate to the heat exchange tubular, and
   wherein the step of rotating the heat exchange tubular includes the step of sweeping the heat exchange tubular with the at least one first and second blades.

13. The method of claim 12, wherein the step of rotating includes reciprocatingly turning the heat exchange tubular.

* * * * *